US010323908B2

(12) United States Patent
Rozant et al.

(10) Patent No.: US 10,323,908 B2
(45) Date of Patent: Jun. 18, 2019

(54) BALLISTIC AND STAB RESISTANT COMPOSITE

(71) Applicant: E I DU PONT DE NEMOURS AND COMPANY, Wilmington, DE (US)

(72) Inventors: Olivier Rozant, Cernex (FR); Yves Bader, Crozet (FR); Louis Boogh, Borex (CH); Nicolas Pont, St. Juliene en Genevois (FR)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 535 days.

(21) Appl. No.: 15/091,982

(22) Filed: Apr. 6, 2016

(65) Prior Publication Data

US 2016/0326690 A1 Nov. 10, 2016

Related U.S. Application Data

(60) Provisional application No. 62/158,612, filed on May 8, 2015.

(51) Int. Cl.
*F41H 5/04* (2006.01)
*B32B 5/02* (2006.01)
(Continued)

(52) U.S. Cl.
CPC ........... *F41H 5/0478* (2013.01); *B29C 70/28* (2013.01); *B32B 5/02* (2013.01); *B32B 5/145* (2013.01);
(Continued)

(58) Field of Classification Search
CPC . F41H 5/0478; C29C 70/28; C08J 5/04; C08J 2300/22; C08J 2300/26; B32B 5/02;
(Continued)

(56) References Cited

U.S. PATENT DOCUMENTS 3,094,511 A 6/1963 Hill et al.
3,264,272 A 8/1966 Rees
(Continued)

FOREIGN PATENT DOCUMENTS

WO 2001/037691 A1 5/2001
WO 2002/026463 A2 4/2002
(Continued)

OTHER PUBLICATIONS

Black et al., "Fiber-Forming Aromatic Polyamides", Man-Made Fibers—Science and Technology, vol. 2, p. 297, Interscience Publishers 1968.
(Continued)

*Primary Examiner* — Cephia D Toomer

(57) ABSTRACT

A flexible composite suitable for use in a knife, pick, bullet and fragment-resistant article comprising
(i) a first zone comprising fabric but no resin, the first first zone comprising from 10 to 90 percent of the total thickness of the composite,
(ii) a third zone comprising an elastomeric or thermoplastic resin but no fabric, the third zone comprising from 0 to 50 percent of the total thickness of the composite and
(iii) a second zone, located between the first and third zones, comprising fabric and an elastomeric or thermoplastic resin, the second zone comprising from 10 to 90 percent of the total thickness of the composite.

19 Claims, 2 Drawing Sheets

(51) Int. Cl.
- *B32B 5/14* (2006.01)
- *B32B 5/26* (2006.01)
- *B32B 25/10* (2006.01)
- *B32B 25/20* (2006.01)
- *B32B 27/12* (2006.01)
- *B32B 27/28* (2006.01)
- *B32B 27/30* (2006.01)
- *B32B 27/32* (2006.01)
- *B32B 27/34* (2006.01)
- *B32B 27/36* (2006.01)
- *B32B 27/40* (2006.01)
- *B29C 70/28* (2006.01)
- *C08J 5/04* (2006.01)

(52) U.S. Cl.
CPC ............... *B32B 5/147* (2013.01); *B32B 5/26* (2013.01); *B32B 25/10* (2013.01); *B32B 25/20* (2013.01); *B32B 27/12* (2013.01); *B32B 27/286* (2013.01); *B32B 27/30* (2013.01); *B32B 27/308* (2013.01); *B32B 27/32* (2013.01); *B32B 27/34* (2013.01); *B32B 27/36* (2013.01); *B32B 27/40* (2013.01); *C08J 5/04* (2013.01); *B32B 2260/021* (2013.01); *B32B 2260/046* (2013.01); *B32B 2260/048* (2013.01); *B32B 2262/0253* (2013.01); *B32B 2262/0269* (2013.01); *B32B 2274/00* (2013.01); *B32B 2307/516* (2013.01); *B32B 2307/518* (2013.01); *B32B 2307/52* (2013.01); *B32B 2307/546* (2013.01); *B32B 2307/581* (2013.01); *B32B 2571/02* (2013.01); *C08J 2300/22* (2013.01); *C08J 2300/26* (2013.01)

(58) Field of Classification Search
CPC ........... B32B 5/145; B32B 5/147; B32B 5/26; B32B 25/10; B32B 25/20; B32B 27/12; B32B 27/286; B32B 27/30; B32B 27/308; B32B 27/32; B32B 27/34; B32B 27/36; B32B 27/40; B32B 2260/021; B32B 2260/046; B32B 2260/048; B32B 2262/0253; B32B 2262/0269; B32B 2274/00; B32B 2307/516; B32B 2307/518; B32B 2307/52; B32B 2307/546; B32B 2307/581; B32B 2571/02

See application file for complete search history.

(56) References Cited

U.S. PATENT DOCUMENTS

| | | | |
|---|---|---|---|
| 3,354,127 A | 11/1967 | Hill et al. | |
| 3,673,143 A | 6/1972 | Bair et al. | |
| 3,767,756 A | 6/1972 | Blades | |
| 3,819,587 A | 6/1974 | Kwoleck | |
| 3,869,429 A | 3/1975 | Blades | |
| 3,869,430 A | 3/1975 | Blades | |
| 4,172,938 A | 10/1979 | Mera et al. | |
| 4,351,931 A | 9/1982 | Armitage | |
| 5,028,674 A | 7/1991 | Hatch et al. | |
| 5,057,593 A | 10/1991 | Marshall et al. | |
| 5,859,137 A | 1/1999 | Chou | |
| 5,866,658 A | 2/1999 | Talkowski | |
| 6,000,055 A | 12/1999 | Citterio | |
| 6,645,336 B1 | 11/2003 | Albertone et al. | |
| 7,968,475 B2 * | 6/2011 | Carbajal | F41H 5/0485 2/2.5 |
| 2008/0032076 A1 | 2/2008 | Dujardin et al. | |

FOREIGN PATENT DOCUMENTS

| | | |
|---|---|---|
| WO | 2003/053676 A1 | 7/2003 |
| WO | 2006/069950 | 7/2006 |
| WO | 2008/105929 A2 | 9/2008 |
| WO | 2008/124257 A2 | 10/2008 |
| WO | 2010/036406 A2 | 4/2010 |
| WO | 2011/156577 A1 | 12/2011 |
| WO | 2012/151645 A1 | 11/2012 |

OTHER PUBLICATIONS

International Search Report, dated Sep. 20, 2016, for International Application No. PCT/US2016/030457, filed May 2, 2016.

* cited by examiner

BALLISTIC AND STAB RESISTANT COMPOSITE

BACKGROUND

1. Field of the Invention

The present invention relates to enhanced, flexible light weight energy absorbing materials and methods of making them. These materials have utility in the manufacture of personal protection equipment (PPE), such as soft armor, bullet, fragment, stab, spike and hypodermic needle protection systems.

2. Description of Related Art

U.S. Pat. No. 5,866,658 discloses thermoplastic compositions which are blends of highly-neutralized ionomers of copolymers of ethylene and high weight percentages of $\alpha,\beta$.-ethylenically-unsaturated $C_3$-$C_8$ carboxylic acids dispersed in a continuous or co-continuous polyamide phase and further discloses a process for making such blends. The blends are particularly useful in applications such as molded parts where toughness, high gloss, abrasion/scratch resistance, UV resistance, high temperature properties and stiffness are desired.

U.S. Pat. No. 5,859,137 discloses thermoplastic ionomers based on ethylene/acid copolymer ionomers which contain both (meth)acrylic acid and certain dicarboxylic acid monomers. The polymers may be melt processed as readily as ethylene/(meth)acrylic acid dipolymer ionomers in contrast to ethylene/acid copolymer ionomers containing only dicarboxylic acid monomer derived in-chain acid units. Polymers with typical levels of (meth)acrylic acid and low levels of diacid provide ionomers comparable to existing ionomers but which have adhesive and polymer blend compatibilizing characteristics, while polymers with higher levels of diacid will exhibit properties which depend on in-chain diacid derived units.

PCT publication WO 01/037691 discloses a protective material comprising a plurality of separate flexible layers each layer comprising a plurality of high strength fibers capable of resisting penetration by a knife or sharp-pointed objects such as ice picks and hypodermic needles, and a support material, wherein at least part of the fibers are embedded within the support material to restrict relative movement of the fibers therein.

PCT publication WO 03/053676 discloses multiple threat penetration resistant articles. The articles include, in order, fabric layers, polymer impregnated fabric layers and woven fabric layers. The articles can additionally include tightly woven fabric layers which define the strike face of the article.

PCT publication WO 2011/156577 discloses a thermoplastic composition for manufacturing personal protection equipment for personal ballistic, stab and knife protection, wherein the thermoplastic composition comprises at least a first thermoplastic polymer that has a melting point different to the melting point of a second thermoplastic polymer.

PCT publication WO 2010/036406 discloses a method for producing fiber composites impregnated with a thermoplastic resin to be used as stab and ballistic composite structures.

PCT publication WO2008/105929 relates to adhesive compositions used in composite laminar structures to improve ballistic resistance, for example, which limits the penetration of a bullet from a gun. The composite laminar structures includes an aramid or olefin fiber layer, a eutectic impact absorbing adhesive resin or adhesive composition layer, and an ionomer layer. The aramid or olefin fiber layer is adhesively bonded with the eutectic impact absorbing adhesive resin or adhesive composition layer to the ionomer layer. In further embodiments, the composite laminar structure includes an olefin fiber layer, a eutectic amorphous acid functional polypropylene copolymer adhesive layer, and an ionomer layer. The olefin fiber layer is adhesively bonded with the eutectic amorphous acid functional polypropylene copolymer adhesive layer to the ionomer layer. The olefin fiber layer has no polarity within a matrix thereof and has no affinity for moisture.

PCT publication WO2006/069950 relates to a heat-shrinkable multilayered film comprising at least one carrier layer (a) based on at least one thermoplastic polymer, at least one gas barrier layer, and at least one sealing layer. The entire free surface of the carrier layer opposing the gas barrier layer is covered with an outer release layer having a plasticizing or melting temperature that is at least 30° C. higher than the sealing or melting temperature of the sealing layer.

U.S. Pat. No. 6,645,336 to Albertone describes a process for the preparation of a laminate, particularly a waterproof moisture vapor permeable laminate, comprising a substrate having on a surface thereof a thermoplastic polymer resin coating and further comprising a peelable release layer in contact with the surface of the thermoplastic polymer resin remote from the substrate, and optionally further comprising a tie layer between the substrate and the thermoplastic polymer resin, the process comprising the steps of forming or providing a substrate layer and providing on a surface thereof a thermoplastic polymer resin coating and a peelable release layer and optionally providing a tie layer between the substrate and the thermoplastic polymer resin coating, characterized in that the thermoplastic polymer resin has a viscosity less than about 3000 Pa·s measured according to the standard ISO11443.

PCT publication WO 2002/026463 discloses an efficient method of simultaneously molding multiple composite laminates comprising layering one or more layers of wet-laid, non-woven mats comprised of particulate thermoplastic polymer and a fiber reinforcement between one or more layers of a release film material and molding the combination to form multiple laminates.

There remains a need to further improve the flexibility of fabric-resin composites used in soft body armor without sacrificing protection against multiple threats such as bullet, knife, stab and needle attacks.

SUMMARY OF THE INVENTION

This invention pertains to a flexible composite suitable for use in a knife, pick, bullet and fragment-resistant article comprising a polymeric fibrous fabric core section free of resin (first zone) and, located on at least one side of the core section, a polymeric fibrous fabric section impregnated with an elastomeric or thermoplastic resin (second zone) wherein:

(i) the resin comprises from 5 to 79 percent of the volume fraction of the composite, (ii) the resin fills up to 100 percent of the fiber-free volume of the second zone, (iii) the first zone comprises from 10 to 90 percent of the total thickness of the composite, (iv) the fibers of the first or second zones have a tenacity of at least 20 g/denier and a tensile modulus of at least 444 g/dtex, and (v) the resin has an elongation to break of between 20 to 1200 percent.

The invention further pertains to a composite suitable for use in a knife, pick, bullet and fragment-resistant article comprising (i) a first zone comprising fabric but no resin, the first zone comprising from 10 to 90 percent of the total thickness of the composite, (ii) a third zone comprising an elastomeric or thermoplastic resin but no fabric, the third zone comprising from 0 to 50 percent of the total thickness of the composite and (iii) a second zone, located between the first and third zones, comprising fabric and an elastomeric or thermoplastic resin, the second zone comprising from 10 to 90 percent of the total thickness of the composite wherein (a) the fabric of the first and second zones is formed from polymeric yarns having a yarn tenacity of at least 20 g/denier and a yarn modulus of at least 444 g/dtex, (b) the elastomeric or thermoplastic resin of the second or third zones has an elongation to break of between 20 to 1200 percent, (c) the resin comprises from 5 to 79 percent of the volume fraction of the second zone, and the resin fills up to 100 percent of the fiber-free volume of the second zone.

An article comprising at least one of the above flexible composites meets the technical requirements of specifications NIJ 0101.04 level IIIA Revision A dated June 2001, of NIJ 0115.00 dated September 2000 and HOSDB publication N° 39/07/C protection level KR1/SP1 E1 dated 2007.

By flexible composite is meant a composite that, when tested according to Test Method A described herein, exhibits a flexural test force no greater than 4000 N.

DETAILED DESCRIPTION

In the context of this application, the term knife, spike, bullet and fragment includes any material or object that produces a similar effect to that of a knife, spike, bullet or fragment.

Fiber-Resin Composite

Figure 1:
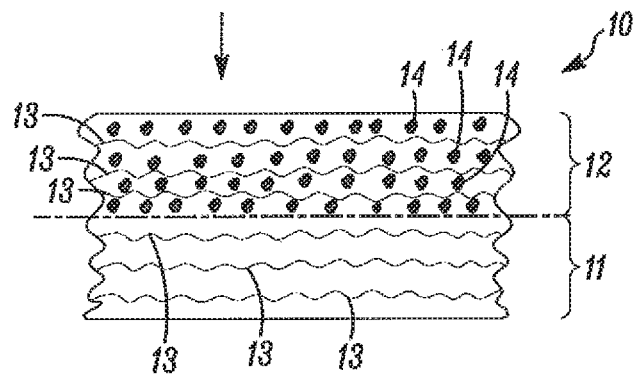
FIGS. 1-5 show sectional views of examples of composites of this invention.
Figure 2:
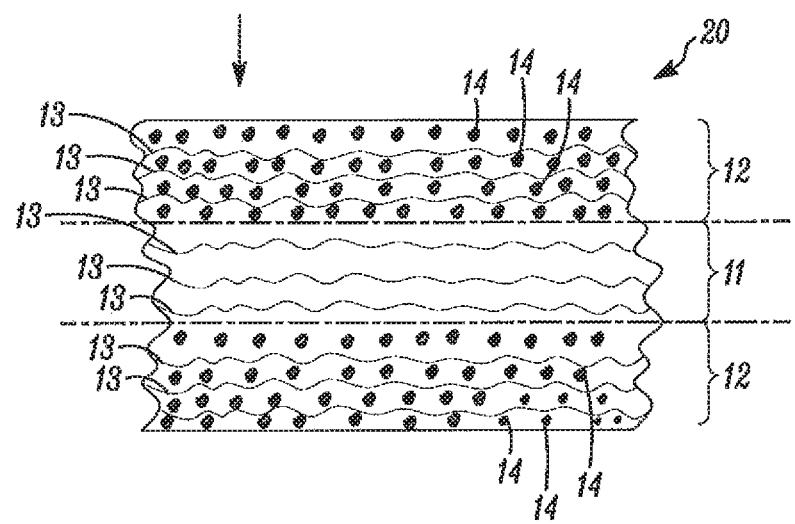

In some embodiments, the fiber-resin composite comprises a polymeric fibrous fabric core section free of resin (first zone) and a polymeric fibrous fabric section impregnated with an elastomeric or thermoplastic resin on at least one side of the core (second zone). FIG. 1 shows generally at 10 a fiber-resin composite comprising a polymeric fibrous fabric core section 11 (first zone) that is free of resin and a polymeric fibrous fabric section 12 (second zone) located on one side of the core section that is impregnated with an elastomeric or thermoplastic resin. The fibrous elements are shown as 13 and the resin as 14. FIG. 2 shows generally at 20 a fiber-resin composite comprising a polymeric fibrous fabric core section 11 (first zone) that is free of resin and a polymeric fibrous fabric section 12 (second zone) located on both sides of the core section 11 that is impregnated with an elastomeric or thermoplastic resin. The fibrous and resin elements are again shown as 13 and 14 respectively.

Preferably, the fibrous core section 11 comprises from 10 to 90 percent of the total thickness of the composite.

Figure 3:
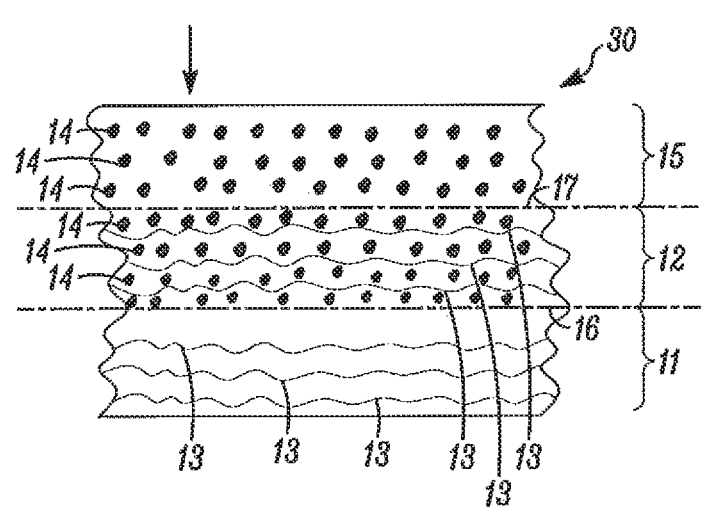

In some other embodiments, as shown at 30 in FIG. 3, the fiber-resin composite comprises a polymeric fibrous fabric core section 11 (first zone) free of resin, a polymeric fibrous fabric section 12 (second zone) impregnated with an elastomeric or thermoplastic resin having a first surface 16 contacting one surface of the core section 11 and an elastomeric or thermoplastic resin section 15 (third zone) that is free of polymeric fibrous fabric contacting the second surface 17 of the polymeric fibrous fabric section 12. The fiber and resin components are shown as 13 and 14 respectively.

Figure 4:
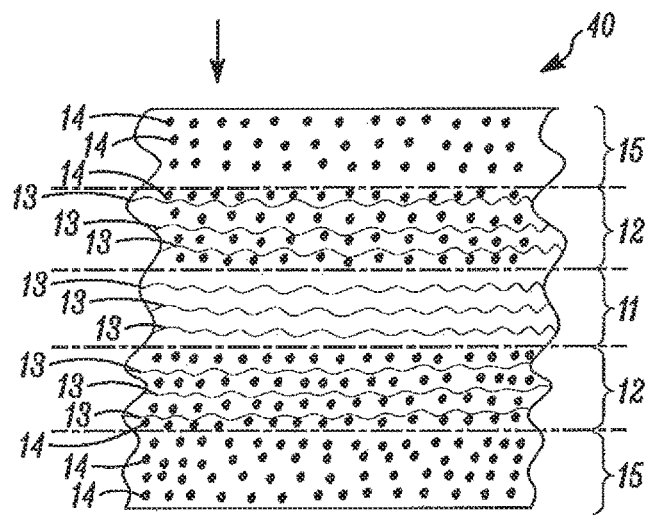

FIG. 4 depicts a fiber-resin composite 40 comprising a polymeric fibrous fabric core section 11 (first zone) free of resin, two polymeric fibrous fabric sections 12 (second zones) impregnated with an elastomeric or thermoplastic resin one located on either side of the core section 11 and an elastomeric or thermoplastic resin section 15 (third zone) that is free of polymeric fibrous fabric positioned on the side of both sections 12 that is remote from the core section 11. The fiber and resin components are shown as 13 and 14 respectively.

Figure 5:
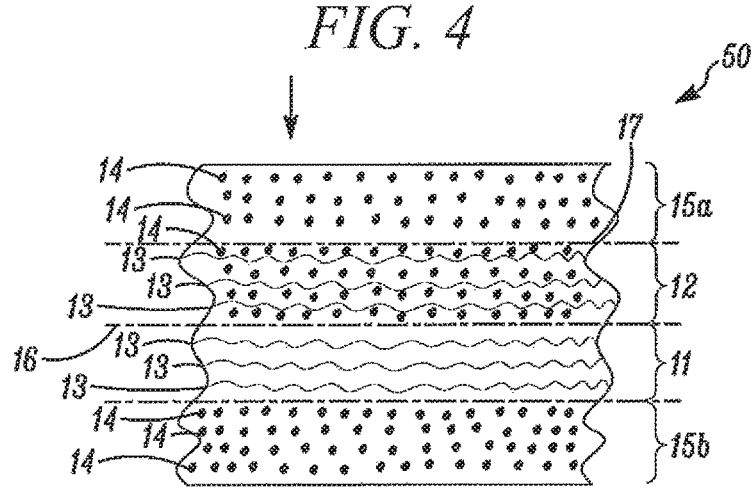
Figure 6:
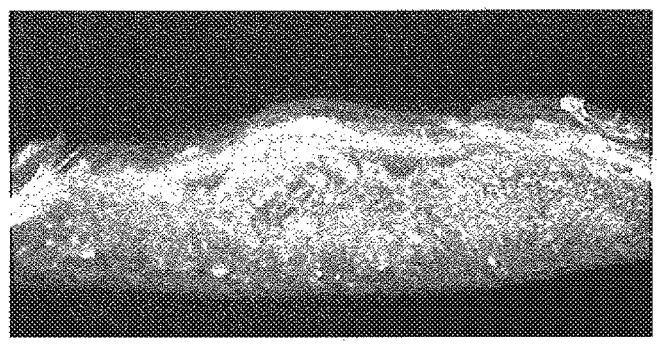
FIG. 6 is a scanned image of a micrograph showing a section through a laboratory produced example based on FIG. 4.

FIG. 5 shows a fiber-resin composite 50 comprising a polymeric fibrous fabric core section 11 (first zone) free of resin, a polymeric fibrous fabric section 12 (second zone) impregnated with an elastomeric or thermoplastic resin having a first surface 16 contacting one surface of the core section 11, a first elastomeric or thermoplastic resin section 15a (third zone) that is free of polymeric fibrous fabric contacting the second surface 17 of section 12, and a second elastomeric or thermoplastic resin section 15b (third zone) that is free of polymeric fibrous fabric contacting the other surface of section 11. The fiber and resin components are shown as 13 and 14 respectively.

In some embodiments, the elastomeric or thermoplastic resin section 15 that is free of polymeric fibrous fabric comprises from 0 to 50 percent of the total thickness of the composite. In some embodiments, the polymeric fibrous fabric section 12 impregnated with an elastomeric or thermoplastic resin comprises from 5 to 90 percent of the total thickness of the composite, and in other embodiments, the fibrous fabric core section 11 free of resin comprises from 10 to 90 percent of the total thickness of the composite.

In these embodiments, it is preferred that the resin is distributed evenly throughout the second zone, that is to say throughout the thickness and across the surface area of the second zone. It is also preferred that the second zone covers the entire surface area of the first zone and, when present, the third zone covers the entire surface area of the first and/or second zones.

The elastomeric or thermoplastic resin section 15 that is free of polymeric fibrous fabric can enhance ballistic-resistance performance and provide a barrier to fluid and moisture permeability, and allow further welding operations for design, assembly purposes or post-laminating operations.

The second zone may optionally have a resin gradient throughout the thickness of the zone wherein the resin content decreases from the outer surfaces of the zone towards the center of the zone.

Thermoplastic Resin

The thermoplastic resin is coated onto, and partially impregnated into, the fabric of section 12 of the composite such that from 10 to 90 percent of the total thickness of the fabric is impregnated with resin. The resin may be coated on one or both sides of the fabric to produce composites as shown in FIGS. 1 and 2. The thermoplastic resin is a polymer. The resin may be polyvinyl, polyolefin and/or polycondensates such as polyethylene, polyethylene copolymers, polypropylene, polypropylene copolymers, polybutylene, polybutylene copolymers, polyamide, polyamide copolymers, polyester, polyurethane, polyurethane copolymers, polyacrylonitrile, or polysulfone. Preferably, the thermoplastic resin polymer has a melting point in the range of from 60° C. to 250° C. and more preferably from 70° C. to 150° C.

Suitable polyethylenes include low density polyethylene, very low density polyethylene, metallocene polyethylene. Examples of polyethylene copolymers are ethylene/α,β-unsaturated C3-C8 carboxylic acid copolymers and/or ethylene/α,β-unsaturated C3-C8 carboxylic acid copolymers partially neutralized with metal salts.

In the case where the thermoplastic polymer is an ethylene/α,β-unsaturated C3-C8 carboxylic acid copolymer, the α,β unsaturated C3-C8 carboxylic acid can be chosen from acrylic acid and/or methacrylic acid.

The ethylene/α,β-unsaturated C3-C8 carboxylic acid copolymer is preferably a terpolymer of ethylene, α,β-unsaturated C3-C8 carboxylic acid and α,β-unsaturated C3-C8 dicarboxylic acid.

The α,β-unsaturated C3-C8 dicarboxylic acid can be chosen from maleic acid, maleic anhydride, C1-C4 alkyl half esters of maleic acid, fumaric acid, itaconic acid and itaconic anhydride.

Preferably, the α,β unsaturated C3-C8 dicarboxylic acid can be chosen from maleic anhydride, ethyl hydrogen maleate and methyl hydrogen maleate.

Most preferably, the α,β-unsaturated C3-C8 dicarboxylic acid is maleic anhydride, methyl hydrogen maleate and/or combinations thereof.

The ethylene/α,β-unsaturated C3-C8 carboxylic acid/α,β-unsaturated C3-C8 dicarboxylic acid polymer can further comprise up to 40 weight percent of an C1-C8 alkyl acrylate softening comonomer, which is preferably chosen among methyl (meth)acrylate, ethyl (meth)acrylate or n-butyl (meth)acrylate, more preferably from n-butyl acrylate or ethyl (meth)acrylate.

The term softening comonomer as mentioned in this description is well-known to those skilled in the art and refers to comonomers such as the C1-C8 alkyl acrylate mentioned above.

The term (meth)acrylate as mentioned in this description is respectively intended to mean acrylate and methacrylate.

In the ethylene/α,β-unsaturated C3-C8 carboxylic acid/α,β-unsaturated C3-C8 dicarboxylic acid polymer, the α,β-unsaturated C3-C8 carboxylic acid can be present in a range of 2 to 25 weight percent and the α,β-unsaturated C3-C8 dicarboxylic acid can be present in a range of 0.1 to 15 weight percent with the proviso that the α,β-unsaturated C3-C8 carboxylic acid and the α,β-unsaturated C3-C8 dicarboxylic acid are present from 4 to 26 weight percent, and with the further proviso that the total comonomer content, including the C1-C8 alkyl acrylate softening comonomer, does not exceed 50 weight percent.

Most preferably, the thermoplastic polymer according to the present invention is an ethylene/α,β-unsaturated C3-C8 carboxylic acid copolymer partially neutralized with metal ions, which is commonly referred to as "ionomer". The total percent neutralization is from 5 to 90 percent, preferably 10 to 70 percent, most preferably between 25 and 60 percent of the ionomer.

In the case where the thermoplastic polymer is an ethylene/α,β-unsaturated C3-C8 carboxylic acid copolymer partially neutralized with metal ions, the α,β-unsaturated C3-C8 carboxylic acid can be chosen from acrylic acid and/or methacrylic acid.

The ethylene/α,β-unsaturated C3-C8 carboxylic acid copolymer partially neutralized with metal ions is preferably a terpolymer of ethylene, α,β-unsaturated C3-C8 carboxylic acid and α,β-unsaturated C3-C8 dicarboxylic acid partially neutralized with metal ions.

The α,β-unsaturated C3-C8 dicarboxylic acid can be chosen from the same components as already described above.

The ethylene/α,β-unsaturated C3-C8 carboxylic acid/α,β-unsaturated C3-C8 dicarboxylic acid polymer partially neutralized with metal ions can further comprise up to 40 weight percent of an C1-C8 alkyl acrylate softening comonomer, which is preferably chosen among the same components as already described above.

In the ethylene/α,β-unsaturated C3-C8 carboxylic acid/α,β-unsaturated C3-C8 dicarboxylic acid polymer partially neutralized with metal ions, from 5 to 90 percent of the total number of α,β-unsaturated C3-C8 carboxylic acid units in the polymer are neutralized with metal ions, and the α,β-unsaturated C3-C8 carboxylic acid and the α,β-unsaturated C3-C8 dicarboxylic acid can be present in the same amounts as described above, with the same proviso regarding the α,β-unsaturated C3-C8 carboxylic acid and the α,β-unsaturated C3-C8 dicarboxylic acid and the same further proviso regarding the total comonomer content, including the C1-C8 alkyl acrylate softening comonomer, as described above.

The ethylene/α,β-unsaturated C3-C8 carboxylic acid copolymer that are partially neutralized are partially neutralized with metal ions which can be any metal ion of group I or group II of the periodic table. In practice however, the preferred metal ions are sodium, zinc, lithium, magnesium, calcium or a mixture of any of these. More preferred are sodium, zinc, lithium and magnesium. Most preferably, the ion is zinc, lithium and/or combinations thereof.

The partially neutralized ethylene/α,β-unsaturated C3-C8 carboxylic acid copolymers according to the present invention may be prepared by standard neutralization techniques, as disclosed in U.S. Pat. No. 3,264,272.

The resulting ionomers may have an melt index (MI) of from 0.01 to 100 grams/10 minutes, preferably 0.1 to 30 grams/10 minutes (g/10 min), as measured using ASTM 0-1238, condition E (190° C., 2160 gram weight).

The above ionomers can be prepared by free-radical copolymerization methods, using high pressure, operating in a continuous manner known in the art such as is described in U.S. Pat. Nos. 4,351,931; 5,028,674; 5,057,593 and 5,859,137.

In addition, the thermoplastic composition may optionally comprise reactive or non-reactive additives such as, but not limited to, colorants, diluents, processing agents, UV additives, fire retardants, mineral fillers, organic fillers, bonding additives, surfactants, aramid pulp, antioxidants, antistatic, slip agents, tackifiers, plasticisers, and/or combinations thereof as known in the art and which can be incorporated by known methods.

Fire retardants may be chosen from brominated flame retardants, red phosphorus, asbestos, antimony trioxide, borates, metal hydrates, metal hydroxides, Tetrakis(hydroxymethyl)phosphonium salts, fluorocarbons and/or combination thereof.

An advantage of using a thermoplastic composition is that the shelf life of the resin is almost unlimited in contrast to a curable thermoset resin which has a limited shelf life. Fabrics pre-impregnated with curable thermoset resins also need to be cured, which is why they generally require more time and energy for manufacturing. In addition, some thermoset resins used with ballistic-resistant fabrics, such as phenolic resins, liberate VOCs (Volatile Organic Compounds) and require additional venting of the storage spaces and additional safety measures during processing. Further, curable materials such as epoxy resins or phenolic resins are much more rigid than the thermoplastic compositions used in to the present invention, which adds to the discomfort felt by the wearer.

The thermoplastic resin may be in the form of a sheet, fabric, hotmelt, powder, liquid, or combinations thereof. The same resins may be used as the resin of the third zone 15.

Elastomeric Resin

The elastomeric resin is coated onto and partially impregnated into the fabric 12 of the composite such that from 10 to 90 percent of the total thickness of the fabric 12 is impregnated with resin. The resin may be coated on one or both sides of the fabric to produce composites as shown in FIGS. 1 and 2. The elastomeric resin is a rubber or silicone. Suitable materials include thermoplastic silicone copolymer, thermoplastic elastomeric block copolymers, such as acrylonitrile-butadiene-styrene, polyisopropene-polyethylene-butylenepolystyrene or polystyrene-polyisoprene-polystyrene block copolymers, polyether-ester block copolymers, thermoplastic polyurethane, thermoplastic polyester, ethylene copolymers with acid monomers, ethylene acrylic elastomer and/or combinations thereof.

Suitable rubbers include both natural rubber, synthetic natural rubber and synthetic rubber. Synthetic rubber compounds can be any which are dissolved by common organic solvents and can include, among many others, polychloroprene and sulfur-modified chloroprene, hydrocarbon rubbers, butadiene-acrylonitrile copolymers, styrene butadiene rubbers, chlorosulfonated polyethylene, fluoroelastomers, polybutadiene rubbers, polyisoprene rubbers, butyl and halobutyl rubbers and the like. Natural rubber, styrene butadiene rubber, polyisoprene rubber and polybutadiene rubber are preferred.

Preferably the thermoplastic or elastomeric resin comprises from 5 to 79 percent of the volume fraction (Vr) of the composite. Preferably, the Vr is from 10-50% or even 20-50%. Vr of the composite is the volume of the composite occupied by the resin component. If the Vr is less than 5%, the composite will have insufficient compaction during the pressing operation which will lead to poor knife or stab resistance, this being particularly true for circular or bean shaped fibers and yarns. If the Vr is greater than 79, there will be insufficient reinforcement fiber to provide ballistic or spike resistance. It is believed therefore that a Vr range of from 5-79% provides an optimum balance for knife, stab, spike and ballistic resistance.

Preferably the thermoplastic or elastomeric resin fills up to 100 percent of the fiber-free volume of the second zone. By fiber-free volume is meant the volume of the composite not occupied by fiber.

Preferably the thermoplastic or elastomeric resin has a Shore Hardness (D) of from 10 to 75. In some embodiments, the flexural modulus of the resin is from 40 MPa to 10 GPa or from 50 MPa to 2 GPa or even from 60 MPa to 600 MPa. In some embodiments, the elongation to break is between 20 to 1200 percent or 100 to 500 percent or even 200 to 400 percent. Preferably the thermoplastic or elastomeric resin has a melt flow index 2160 g [g/10 min] at 190° C. (ASTM D1238—Condition E) of from 0.1 to 100 and more preferably from 0.5 to 20.

The same resins may be used as the resin of the third zone 15.

Fabric

The fabric may be woven, nonwoven, three-dimensional (3D) or knitted, braided or micro-braided. Examples of woven fabric styles include plain, satin, basket, twill, crowfoot, rip-stop and leno weaves. The nonwoven fabric may be a unidirectional, biaxial or multiaxial fabric, these terms being well known in the textile art. In the context of this invention, a nonwoven fabric also includes a matt of randomly oriented short fibers such as needled or hydroentangled felts, meltblown and spunbonded fabrics. A unidirectional fabric is a fabric wherein all the yarns within one layer of the fabric are aligned in one direction. A multiaxial fabric is a non-crimped fabric comprising a plurality of unidirectional fabric layers wherein the yarn orientation between successive layers is in a different direction. Common multiaxial fabrics comprise two, four or six layers. U.S. Pat. No. 6,000,055 to Citterio describes a multiaxial fabric suitable for use in a ballistic resistant article.

Pluralities of adjacent unidirectional fabric layers may be held together by stitching in a transverse direction through the plane of the unidirectional layers or from a polymeric bonding substrate placed between the adjacent layers. In some embodiments, a combination of both transverse yarn stitching and a polymeric bonding substrate may be used. A fabric in the form of a knit may also be suitable for use in this application.

The fabric comprises yarns, a yarn being a plurality of filaments or fibers. The term filament or fiber is used interchangeably. The yarn may comprise continuous filaments or be a staple spun yarn or a stretch-broken yarn. In some embodiments, the fabrics are those comprising yarns having a yarn tenacity of at least 15 g/dtex, and a tensile modulus of at least 40 g/dtex. Preferably, the yarns have a tenacity of at least 20 g/dtex, and a tensile modulus of at least 444 g/dtex (400 g/denier). In some embodiments, the yarns have a linear density of from 220 to 3300 dtex or even from 440 to 1400 dtex. In another embodiment, the yarns have a linear density of 1100 dtex.

The filaments of the yarn are polymeric. Suitable polymers include aromatic polyamide, aromatic co-polyamide and polyethylene. An exemplary aromatic polyamide is poly-paraphenylene terephthalamide (p-aramid) commercially available as Kevlar® from E.I. du Pont de Nemours and Company, Wilmington, Del. (hereinafter DuPont). Other suitable fibers include liquid crystalline polymer and polyazole fibers, for example, polybenzimidazoles or polybenzoxazoles, especially poly-para-phenylene-2,6-benzobisoxazole (PBO), 5-amino-2-(p-aminophenyl)-benzimidazole, or poly(2,6-diimidazo[4,5-b-4,5-e]pyridinylene-1,4-(2,5-dihydroxy)phenylene) fibers. Another fiber type is highly oriented polyolefin fiber, for example, high molecular weight polyethylene (HMPE) fiber or polypropylene fiber. Suitable grades of nylon fibers and high strength mineral fibers, for example, glass fibers, basalt fibers or ceramic fibers may also be used provided that the resulting fabric meets the ballistic performance requirements.

Preferably, the fiber material can be chosen among highly oriented polyolefin fibers, aromatic polyamide fibers, PBO fibers, glass fibers, or combinations thereof. More preferably, the fiber material is poly-paraphenylene terephthalamide or poly-metaphenylene isophthalamide. A preferred aromatic polyamide is para-aramid. As used herein, the term para-aramid filaments means filaments made of para-aramid polymer. The term aramid means a polyamide wherein at least 85% of the amide (—CONN—) linkages are attached directly to two aromatic rings. Suitable aramid fibers are described in Man-Made Fibers—Science and Technology, Volume 2, in the section titled Fiber-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

Protective Article

A fiber-resin composite of this invention can be assembled into a protective article. In some embodiments a plurality of fiber-resin composites are assembled into a protective article. The number of composites required will depend on the specific performance requirements of the article but may be between four and forty. In some embodiments, it is preferred that the fiber-resin composite is assembled in the article as shown in FIGS. 1-5 to face the icoming threat, the threat being shown by a downward pointing arrow. The article may comprise other components such as foam, fabrics, non-wovens, laminates, plastic sheets, metal, glass or ceramics. Preferably, the individual fiber-resin composites of the article are not connected to each other in a way that restricts their movement relative to each other, but only in a way to form a stack comprising a coherent bundle of free individual composites. This can be done, for example, by stitching the assembly of composites in such a way that only a very small percentage, say less than 10% or 5%, of the surfaces of the composites are stitched together. This can be done, for example, by edge or corner stitching, these techniques being well known in the art. Alternatively, the fabric layers may be stacked on top of each other and placed into pouches or bags. When the third zone is present as an outer layer of the composite, this may faciliate the formation and sealing of the pouch. Thus each individual reinforced fabric layer of the invention is able to move with respect to other fabric layers, within the plane defined by that individual reinforced fabric layer. Alternatively, the stack can be taped along the edges.

The article may be useful in different applications such as where protection for the body including chest, arm, hands and knee is sought against multiple threats, such as for example knife and spike threats, but also against ballistic threats.

Method of Making the Composite

The resin may be partially infused into the fabric using methods well known in the composite materials art. Such methods include hot pressing in a platten press or continuous belt press, vacuum infusion techniques such as resin film infusion (RFI), calendaring, powder coating, liquid coating, dipping and extrusion coating. The temperature and pressure applied to complete the desired degree of infusion of resin into the fabric will vary depending on factors such as fabric style, resin type and the desired level of impregnation. An example of one such method comprises the steps of:

(a) providing an assembly comprising in order, a release layer, a thermoplastic resin layer, a fabric and, optionally, a second thermoplastic resin layer and release layer, (b) combining a plurality of assemblies of step (a) into a stack, (c) subjecting the stack from step (b) to a thermopressing process wherein the process comprises a minimum of two cycles where each cycle comprises
  (i) thermopressing the stack for a defined period under a defined temperature and pressure, and
  (ii) releasing the pressure on the stack for a defined period of time, (d) cooling the stack, (e) removing the individual assemblies from the stack, and (f) removing the release layer(s) from each assembly to leave a composite, wherein the defined time periods, temperatures and pressures of each thermopressing cycle are such that the composite has up to 100% of the void volume of the fabric filled with resin. More preferably, between 50 to 100% of the void volume of the fabric is filled with resin.

The thickness of the resin layer prior to impregnation into the fabric is governed by the end-use application. In some embodiments when only one side of the fabric has to be impregnated, then the thickness of the resin layer is preferably from 10 to 200 micrometers. If both sides of the fabric have to be impregnated, then the thickness of each resin layer should preferably be from 5 to 150 micrometers and more preferably from 15 to 100 micrometers.

The temperature at which the fabric is impregnated with the resin must be at least at or above the melting point of the resin, with the proviso that the temperature does not exceed a temperature that adversely affects the fabric fiber. These temperatures are, for example, at 230° C. for aramids, 140° C. for high molecular weight polyethylene (HMPE), 300° C. for PBO and 450° C. for glass fiber.

In some embodiments, the thermopressing process stage of the present inventions is carried out in a plurality of steps. The number of thermopressing steps may be two, three, four or even more.

The type of structure described in zone 3 can have utility in subsequent processing activities such as providing adhesion, encapsulation, thermoforming enablement, or sealing.

Test Methods

The degree of impregnation through the thickness of the laminate was determined by image analyses of the laminate cross-section under a binocular-type microscope. The ratio of the impregnated area and fibrous area gave the volume percentage of impregnation of the laminate. The degree of impregnation of a layer of the composite (first, second or third zones) was determined from the fiber-to-resin weight ratio and the fiber-to-resin density ratio. The fibrous material was assumed homogeneous, hence the fiber (specific) weight was calculated as the areal density of the fibrous material multiplied by the percentage of impregnation of the laminate determined here above. The resin (specific) weight was the resin film areal density. In cases where the areal density was not known, the fibrous material and the composite weights were measured. The resin weight was the difference between the composite and fiber weights. Once both the fiber and resin weights were determined, the fiber-to-resin volume ratio was calculated as:

$$\frac{V_f}{V_r} = \frac{W_f}{W_r} * \frac{\rho_r}{\rho_f}$$

The matrix volume ratio was determined as:

$$V_m = \frac{1}{1 + \frac{V_f}{V_r}}$$

The fiber volume ratio was deduced as:

$$V_f = 1 - V_m - V_{voids}$$

The void volume content was assumed to be negligible.

Knife and spike resistance of an article comprising a plurality of composites of this invention was tested according to the HOSDB 07 Standard from the United Kingdom Home Office, Police Science and Development Branch (PSDB) HOSDB 07 Standards "PSDB Body Armor standards for UK Police, Part 3, Knife and Spike resistance" using a P1B test blade dated 2007.

Flexural testing of the article was as follows. A Zwick compression test machine was equipped with a 5 cm thick polyethylene plate having a 15 cm diameter hole. The plate was fixed with the help of holding plugs to the bottom section of the test machine in such a way that the hole was centered with the axes of the load which is also the axis of the machine. A hemispherical polyethylene punch having a diameter of 5 cm was fixed to the moving part of the traction machine. An article comprising thirty layers of fiber-resin impregnated composites was tested for pack flexibility. The sample dimensions were 40 cm×40 cm. The test consisted of measuring the force on the punch required to push the composite 40 mm down through the hole. This force is called "Flexural Test Force" in Table 1. This test method is referenced herein as Test Method A.

Ballistic resistance values are reported as V50 which is a statistical measure that identifies the average velocity at which a bullet or a fragment penetrates the armor equipment in 50% of the shots, versus non penetration of the other 50%. The parameter measured is V50 at zero degrees where the degree angle refers to the obliquity of the projectile to the target. The reported values are average values for the number of shots fired for each example. V50 resistance to 9 mm full metal jacket (FMJ) Remington bullets and 44 magnum SJHP Remington projectiles was tested to STANAG 2920. Edition 2.

Areal weights were determined according to ISO 3801. Thicknesses were measured as per ISO 5084.

EXAMPLES

The present invention is further exemplified by the following Examples. It should be understood that these examples are given by way of illustration only. All parts and percentages are by volume fraction unless otherwise indicated. Examples prepared according to the current invention are indicated by numerical values. Control or Comparative Examples are indicated by letters. Data and test results relating to the Comparative and Inventive Examples are shown in Table 1.

In Comparative Examples A, B and C and in Examples 1 and 2, the fabric was a plain weave fabric comprising poly-p-phenylene terephtalamide yarns of 1100 dtex, commercially available from DuPont under the tradename Kevlar® merge 1K1533. The fabric had 8.5 ends/cm in both warp and weft directions and had an areal weight of 185 gsm.

In Comparative Examples A and C, the polymeric film was prepared by blown film extrusion. The film was an ionomeric composition comprising (i) a copolymer of ethylene and 19 wt-% MAA (methacrylic acid), wherein 45% of the available carboxylic acid moieties were neutralized with sodium cations, the copolymer being obtained from DuPont, and (ii) 1.1 wt-% of a color masterbatch based on an EVA matrix. The extruded film was 55 micrometer thick. A similar film was produced and used in Comparative Example B, and Examples 1 and 2 except that the film thickness was 40 micrometers.

Comparative Example A

An assembly was made by manually stacking in order a silicone paper release layer, an extruded thermoplastic film layer, a fabric layer, an extruded thermoplastic film layer and a silicone paper release layer. Thirty of the assemblies were placed on top of each other to form a stack.

The stack was placed in a heating press (50 Ton press from SATIM) and thermopressed with the following cycle:
(a) heating the press at 105° C. for 21 minutes;
(b) inserting the stack;
(c) thermopressing the stack for 10 minutes at 135° C. and 10 bars;
(d) thermopressing the stack for 20 minutes at 135° C. and 20 bars;
(e) cooling the stack to 50° C. for 20 minutes under a pressure of 20 bars,
(f) retrieving each assembly from the stack, (g) cooling each assembly to room temperature and removing the silicone paper release layers from each assembly to leave a resin infused fabric composite.

The composite had an areal weight of 290 gsm and an average thickness of 251 micrometers. The volumetric mass was 1160 kg/cu·m. Under these processing conditions, full impregnation of resin through the thickness of the fabric was achieved. Based on the fabric and film characteristics, and assuming less than five percent of voids distributed through the thickness, there is no fibrous (Zone 1) remaining, the degree of impregnation (Zone 2) through the thickness is 65 percent, the resin sheath (zone) is 35%. The overall fibre volume content $V_f$ was 51 percent and the resin volume content $V_r$ was 44 percent.

A test pack article for stab resistance testing was prepared comprising twenty five layers of composites and one closed cell foam layer. The foam layer which was positioned at the back of the test pack was 3 mm thick and had an areal weight of 100 gsm. The pack was kept at room temperature for 24 hours before being tested according to the HOSDB 07 standard. A P1B test blade was used. The witness plate was foam. Each test comprised 10 drops of a new blade at 24 or 36 joules of attacking (incident) energy. There was no penetration of the blade into the witness plate, that is to say, the blade did not pass through the test pack article. A repeat test but at 36 joules of attacking energy resulted in an average blade penetration into the witness plate of 13.8 mm.

The above test was repeated but this time an SPB test spike was used. At 24 joules of attacking energy there was no penetration of the spike into the witness plate. The flexural test force at 40 mm deflection was 9998 N.

For ballistic resistance testing, a test pack article was prepared comprising thirty layers of composites adjacent to a closed cell foam layer. The foam layer which was positioned at the back of the test pack was 3 mm thick and had an areal weight of 100 gsm. Ballistic resistance was measured on dry samples conditioned at room temperature for 24 hours. The V50 resistance to 9 mm FMJ bullets was 522 m/s. The V50 resistance to 44 Mag SJHP bullets was 481 m/s.

Comparative Example B

An assembly was made by manually stacking in order a silicone paper release layer, an extruded thermoplastic film layer, a fabric layer, an extruded thermoplastic film layer and a silicone paper release layer as per Comparative Example A. Two of these assemblies were formed into a stack. The stack was placed in a heating press (50 Ton press from SATIM) and subjected to the following thermopressing cycle with the following cycle:
(a) heating the first zone of the press at 90° C.,
(b) inserting the stack, (c) thermopressing the stack for 20 seconds at 90° C. and 30 bars, (d) releasing the pressure on the stack for 20 seconds by opening the press, (e) heating the press to 180° C., (f) thermopressing the stack for 20 seconds at 180° C. and 30 bars, (g) releasing the pressure on the stack for 20 seconds by opening the press, (h) heating the press to 80° C., (i) thermopressing the stack for 20 seconds at 80° C. and 30 bars, (j) releasing the pressure on the stack for 20 seconds by opening the press, (k) heating the press to 30° C., (l) thermopressing the stack for 20 seconds at 30° C., (m) opening the press, removing the stack from the press and removing the assemblies from the stack. Cooling the assemblies at room temperature for 10 minutes under no pressure, and (n) removing the silicone paper release layers from each assembly to give a resin infused fabric composite.

The composite had an areal weight of 263 gsm and an average thickness of 216 micrometers. The volumetric mass was 1216 kg/cu·m. Under these processing conditions, full impregnation of resin through the thickness of the fabric was achieved. Based on the fabric and film characteristics, and assuming less than three percent of voids distributed through the thickness, there is no fibrous (Zone 1) remaining, the degree of impregnation (Zone 2) through the thickness is 71 percent, the resin sheath (zone) is 29%. The overall fibre volume content $V_f$ was 59 percent and the resin volume content $V_r$ was 37 percent.

Blade and spike tests similar to those for Comparative Example A were carried out. A test pack article for stab resistance testing was prepared comprising twenty nine layers of composites and one closed cell foam layer. The foam layer which was positioned at the back of the test pack was 3 mm thick and had an areal weight of 100 gsm. The pack was kept at room temperature for 24 hours before being tested according to the HOSDB 07 standard. A P18 test blade was used. The witness plate was foam. Each test comprised 10 drops of a new blade at 24 or 36 joules of attacking (incident) energy. The blade test showed no penetration of the witness plate for 24 joules of attacking energy and an average blade penetration of 8.0 mm into the witness plate for 36 joules of attacking energy. The spike test using a SPB test spike gave no penetration at 24 joules of attacking energy again showing no penetration.

The flexural test force at 40 mm deflection was 5546 N.

For ballistic resistance testing, a test pack article was prepared comprising twenty nine layers of composites adjacent to a closed cell foam layer. The foam layer which was positioned at the back of the test pack was 3 mm thick and had an areal weight of 100 gsm. Ballistic tests gave a V50 resistance to 9 mm FMJ bullets of 519 m/s.

Comparative Example C

An assembly was made by manually stacking in order a silicone paper release layer, an extruded thermoplastic film layer, a fabric layer, and a silicone paper release layer. Thirty of the assemblies were placed on top of each other to form a stack.

The stack was placed in a heating press (50 Ton press from SATIM) and thermopressed with the following cycle:

(a) heating the press at 105° C. for 21 minutes;

(b) inserting the stack;

(c) thermopressing the stack for 10 minutes at 135° C. and 10 bars;

(d) thermopressing the stack for 20 minutes at 135° C. and 20 bars;

(e) cooling the stack to 50° C. for 20 minutes under a pressure of 20 bars, (f) retrieving each assembly from the stack, (g) cooling each assembly to room temperature and removing the silicone paper release layers from each assembly to leave a resin infused fabric composite.

The composite had an areal weight of 238 gsm and an average thickness of 198 micrometers. The volumetric mass was 1206 kg/cu·m. Under these processing conditions, full impregnation of resin through the thickness of the fabric was achieved. Based on the fabric and film characteristics, and assuming less than seven percent of voids distributed through the thickness, there is no fibrous (Zone 1) remaining, the degree of impregnation (Zone 2) through the thickness is 95 percent, the resin sheath (zone) is 5%. The overall fibre volume content $V_f$ was 65 percent and the resin volume content $V_r$ was 28 percent.

A test pack article for stab resistance testing was prepared comprising thirty layers of composites and one closed cell foam layer. The foam layer which was positioned at the back of the test pack was 3 mm thick and had an areal weight of 100 gsm. The pack was kept at room temperature for 24 hours before being tested according to the HOSDB 07 standard. A P18 test blade was used. The witness plate was foam. Each test comprised 10 drops of a new blade at 24 or 36 joules of attacking (incident) energy. There was 0.6 mm penetration of the blade into the witness plate. A repeat test but at 36 joules of attacking energy resulted in an average blade penetration into the witness plate of 19.0 mm.

The above test was repeated but this time an SPB test spike was used. At 24 joules of attacking energy there was no penetration of the spike into the witness plate. The flexural test force at 40 mm deflection was 4179 N.

For ballistic resistance testing, a test pack article was prepared comprising thirty layers of composites adjacent to a closed cell foam layer. The foam layer which was positioned at the back of the test pack was 3 mm thick and had an areal weight of 100 gsm. Ballistic resistance was measured on dry samples conditioned at room temperature for 24 hours. The V50 resistance to 9 mm FMJ bullets was 505 m/s. The V50 resistance to 44 Mag SJHP bullets was 482 m/s.

Example 1

The assembly stacking order and processing equipment was the same as for Comparative Example B. The process cycle was:

(a) heating the first zone of the press at 90° C., (b) inserting the stack, (c) thermopressing the stack for 20 seconds at 90° C. and 30 bars, (d) releasing the pressure on the stack for 20 seconds by opening the press, (e) heating the press to 165° C., (f) thermopressing the stack for 20 seconds at 165° C. and 30 bars, (g) releasing the pressure on the stack for 20 seconds by opening the press, (h) heating the press to 80° C., (i) thermopressing the stack for 20 seconds at 80° C. and 30 bars, (j) releasing the pressure on the stack for 20 seconds by opening the press,
(k) heating the press to 30° C.,
(l) thermopressing the stack for 20 seconds at 30° C.,
(m) opening the press, removing the stack from the press and removing the assemblies from the stack. Cooling the assemblies at room temperature for 10 minutes under no pressure, and
(n) removing the silicone paper release layers from each assembly to give a resin infused fabric composite.

Under these processing conditions, full impregnation through the thickness of the fabric was not achieved and a structure according to FIG. 4 was achieved.

The composite had an areal weight of 263 gsm and an average thickness of 252 micrometers. The volumetric mass was 1044 kg/cu·m. The elastomeric or thermoplastic resin section 15 that is free of polymeric fibrous fabric was 25% of the total thickness of the composite. The two polymeric fibrous fabric sections 12 impregnated with an elastomeric or thermoplastic resin was 33% of the total thickness of the composite. The fibrous fabric core section 11 free of resin was 42% of the total thickness of the composite. The overall fibre volume content $V_f$ was 51 percent and the resin volume content $V_r$ was 32 percent.

Blade and spike tests similar to those for Comparative Example A were carried out. A test pack article for stab resistance testing was prepared comprising twenty nine layers of composites and one closed cell foam layer. The foam layer which was positioned at the back of the test pack was 3 mm thick and had an areal weight of 100 gsm. The pack was kept at room temperature for 24 hours before being tested according to the HOSDB 07 standard. A P18 test blade was used. The witness plate was foam. Each test comprised 10 drops of a new blade at 24 or 36 joules of attacking (incident) energy. The blade test showed no penetration of the witness plate for 24 joules of attacking energy and an average blade penetration of 13.5 mm into the witness plate for 36 joules of attacking energy. The spike test using a SPB test spike gave no penetration at 24 joules of attacking energy as with the comparative examples.

The flexural test force at 40 mm deflection was 3344 N.

For ballistic resistance testing, a test pack article was prepared comprising twenty nine layers of composites adjacent to a closed cell foam layer. The foam layer which was positioned at the back of the test pack was 3 mm thick and had an areal weight of 100 gsm. Ballistic tests gave a V50 resistance to 9 mm FMJ bullets of 522 m/s and a V50 resistance to 44 Mag SJHP bullets of 486 m/s.

Example 2

The assembly stacking order and processing equipment was the same as for Comparative Example B. The process cycle was:
(a) heating the first zone of the press at 90° C.,
(b) inserting the stack,
(c) thermopressing the stack for 10 seconds at 90° C. and 15 bars,
(d) releasing the pressure on the stack for 20 seconds by opening the press,
(e) heating the press to 165° C.,
(f) thermopressing the stack for 10 seconds at 165° C. and 15 bars,
(g) releasing the pressure on the stack for 20 seconds by opening the press,
(h) heating the press to 80° C.,
(i) thermopressing the stack for 10 seconds at 80° C. and 15 bars,
(j) releasing the pressure on the stack for 20 seconds by opening the press,
(k) heating the press to 30° C.,
(l) thermopressing the stack for 10 seconds at 30° C.,
(m) opening the press, removing the stack from the press and removing the assemblies from the stack. Cooling the assemblies at room temperature for 10 minutes under no pressure, and
(n) removing the silicone paper release layers from each assembly to give a resin infused fabric composite.

Under these processing conditions, full impregnation through the thickness of the fabric was not achieved and a structure according to FIG. 4 was achieved.

The composite had an areal weight of 263 gsm and an average thickness of 269 micrometers. The volumetric mass was 976 kg/cu·m. The elastomeric or thermoplastic resin section 15 that is free of polymeric fibrous fabric was 22% of the total thickness of the composite. The two polymeric fibrous fabric sections 12 impregnated with an elastomeric or thermoplastic resin was 11% of the total thickness of the composite. The fibrous fabric core section 11 free of resin was 67% of the total thickness of the composite. The overall fibre volume content $V_f$ was 48 percent and the resin volume content $V_r$ was 30 percent.

Blade and spike tests similar to those for Comparative Example A were carried out. A test pack article for stab resistance testing was prepared comprising twenty nine layers of composites and one closed cell foam layer. The foam layer which was positioned at the back of the test pack was 3 mm thick and had an areal weight of 100 gsm. The pack was kept at room temperature for 24 hours before being tested according to the HOSDB 07 standard. A P18 test blade was used. The witness plate was foam. Each test comprised 10 drops of a new blade at 24 or 36 joules of attacking (incident) energy. The blade test showed 3.3 mm penetration of the witness plate for 24 joules of attacking. The spike test using a SPB test spike gave no penetration at 24 joules of attacking energy as with the comparative examples.

The flexural test force at 40 mm deflection was 3271 N.

For ballistic resistance testing, a test pack article was prepared comprising twenty nine layers of composites adjacent to a closed cell foam layer. The foam layer which was positioned at the back of the test pack was 3 mm thick and had an areal weight of 100 gsm. Ballistic tests gave a V50 resistance to 44 Mag SJHP bullets of 476 m/s.

The superior flexibility at similar areal weight of the inventive examples when compared to the comparative examples is very attractive to users. The results are summarized in Table 1.

TABLE 1

| Test | Units | Comp Ex A | Comp Ex B | Comp Ex C | Example 1 | Example 2 |
| --- | --- | --- | --- | --- | --- | --- |
| Composite Weight | g/m² | 292 | 263 | 238 | 263 | 263 |
| Zone 1 - Fibrous (measured) | % | 0% | 0% | 0% | 42% | 67% |

TABLE 1-continued

| Test | Units | Comp Ex A | Comp Ex B | Comp Ex C | Example 1 | Example 2 |
|---|---|---|---|---|---|---|
| Zone 2 - Composites (measured) | % | 65% | 71% | 95% | 33% | 11% |
| Zone 3 - Resin sheath (measured) | % | 35% | 29% | 5% | 25% | 22% |
| Resin content $W_r$ (calculated) | % | 37% | 30% | 22% | 30% | 30% |
| Volumic mass (calculated) | kg/m$^3$ | 1160 | 1216 | 1206 | 1044 | 976 |
| Thickness (measured from pictures) | microns | 251 | 216 | 198 | 252 | 269 |
| Number of layers for puncture tests | — | 25 | 29 | 30 | 29 | 29 |
| Average Blade Penetration P1B 24 J | mm | Not Tested | Not Tested | 0.6 | 3.4 | 3.3 |
| Average Blade Penetration P1B 36 J | mm | 13.8 | 8.0 | 19.0 | 13.5 | Not Tested |
| Average Spike Penetration SP1B 24 J | mm | 0 | 0 | 0 | 0 | 0 |
| Number of layers for ballistic and flex tests | — | 30 | 29 | 30 | 29 | 29 |
| V50 for 9 mm Projectile | m/s | 522 | 519 | 505 | 522 | Not Tested |
| V50 for 44 Mag bullet | m/s | 481 | Not Tested | 482 | 486 | 476 |
| Flexural Test Force @ 40 mm | N | 9998 | 5546 | 4179 | 3581 | 3271 |

All examples, comparative and inventive, summarized in the above table of results were constructed of the same material composition and were tested under the same conditions. Manufacturing of these examples was carried out on commercially available equipment. The results demonstrate that the products of the claimed invention, as exemplified by Examples 1 and 2, exhibit a much higher flexural performance as per Flexural Test Force measurements at 40 mm than Comparative Examples A, B, and C. Examples 1 and 2 shows from about a 10 to about a 70% improvement in flexural performance. Furthermore, the thermopressing time is considerably reduced from, for example, about 20 minutes for Comparative Examples A and C to a few seconds depending on the most suitable temperature selection for Examples 1 and 2. Additionally, knife-blade penetration, spike penetration and ballistic V50 testing, performed to current standards are all compliant with those standard requirements.

The invention claimed is:

1. A composite suitable for use in a knife, pick, bullet and fragment-resistant article comprising a polymeric fibrous fabric core section free of resin (first zone) and, located on at least one side of the core section, a polymeric fibrous fabric section impregnated with an elastomeric or thermoplastic resin (second zone)
    wherein:
    (i) the resin comprises from 5 to 79 percent of the volume fraction of the composite,
    (ii) the resin fills up to 100 percent of a fiber-free volume of the second zone,
    (iii) the first zone comprises from 10 to 90 percent of the total thickness of the composite,
    (iv) the fibers of the first or second zones have a tenacity of at least 20 g/denier and a tensile modulus of at least 444 g/dtex, and
    (v) the resin has an elongation to break of between 20 to 1200 percent.

2. The composite of claim 1 wherein the fabric of the first or second zones is woven, nonwoven, braided or knit.

3. The composite of claim 1 wherein the polymer of the fibers of the fabric of the first or second zones is aromatic polyamide, aromatic co-polyamide or polyethylene.

4. The composite of claim 1 wherein the thermoplastic resin is polyvinyl, polyolefin, polyamide, polyester, polyurethane, polyacrylonitrile or polysulfone.

5. The composite of claim 1 wherein the elastomer is rubber or silicone.

6. The composite of claim 2 wherein the nonwoven fabric is unidirectional, biaxial, multiaxial.

7. A composite suitable for use in a knife, pick, bullet and fragment-resistant article comprising
    (i) a first zone comprising fabric but no resin, the first first zone comprising from 10 to 90 percent of the total thickness of the composite,
    (ii) a third zone comprising an elastomeric or thermoplastic resin but no fabric, the third zone comprising from 0 to 50 percent of the total thickness of the composite and
    (iii) a second zone comprising fabric and an elastomeric or thermoplastic resin, the second zone comprising from 10 to 90 percent of the total thickness of the composite wherein
        (a) the fabric of the first and second zones is formed from polymeric yarns having a yarn tenacity of at least 20 g/denier and a yarn modulus of at least 444 g/dtex,
        (b) the elastomeric or thermoplastic resin of the second or third zones has an elongation to break of between 20 to 1200 percent,
        (c) the resin comprises from 5 to 79 percent of the volume fraction of the second zone, and
        (d) the resin fills between 80 to 100 percent of a fiber-free volume of the second zone.

8. The composite of claim 7 wherein the fabric is woven, nonwoven or knit.

9. The composite of claim 7 wherein the polymer of the yarns of the fabric is aromatic polyamide, aromatic co-polyamide or polyethylene.

10. The composite of claim 7 wherein the thermoplastic resin is polyvinyl, polyolefin, polyamide, polyester, polyurethane, polyacrylonitrile or polysulfone.

11. The composite of claim 7 wherein the elastomer is rubber or silicone.

12. The composite of claim 8 wherein the nonwoven fabric is unidirectional, biaxial, multiaxial.

13. A protective article comprising at least one composite of claim 1 or claim 7 that is knife, pick, bullet and fragment-resistant.

14. The protective article of claim 13 wherein the article meets the requirements of NIJ 0101.04 level IIIA Revision A dated June 2001, of NIJ 0115.00 dated September 200 and of HOSDB publication No 39/07/C protection level KR1/SP1 E1 standards dated 2007.

15. The protective article of claim 13 wherein the article, when tested according to Test Method A, exhibits a flexural force no greater than 4000 N.

16. The composite of claim 7, wherein the second zone is located between the first and third zones when the third zone comprises greater than 0 percent of the total thickness of the composite.

17. The composite of claim 7, wherein the first zone is located between the second and third zones when the third zone comprises greater than 0 percent of the total thickness of the composite.

18. The composite of claim 7, wherein the second zone covers the entire surface area of at least one side of the first zone.

19. The composite of claim 7, wherein the third zone covers the entire surface area of at least one side of the first zone or the second zone.

\* \* \* \* \*